(12) United States Patent
 Zell

(10) Patent No.: US 12,070,828 B2
(45) Date of Patent: Aug. 27, 2024

(54) CELL AND METHOD FOR OPERATING A CELL OF AT LEAST TWO LINKED HORIZONTAL MACHINING CENTERS

(71) Applicant: BAVIUS TECHNOLOGIE GMBH, Baienfurt (DE)

(72) Inventor: Werner Zell, Eberhardzell (DE)

(73) Assignee: BAVIUS TECHNOLOGIE GMBH, Baienfurt (DE)

( * ) Notice: Subject to any disclaimer, the term of this patent is extended or adjusted under 35 U.S.C. 154(b) by 231 days.

(21) Appl. No.: 17/753,734

(22) PCT Filed: Aug. 10, 2020

(86) PCT No.: PCT/EP2020/072339
§ 371 (c)(1),
(2) Date: Mar. 11, 2022

(87) PCT Pub. No.: WO2021/047838
PCT Pub. Date: Mar. 18, 2021

(65) Prior Publication Data
US 2022/0339750 A1    Oct. 27, 2022

(30) Foreign Application Priority Data
Sep. 11, 2019   (DE) .................. 10 2019 213 872.1

(51) Int. Cl.
*B23Q 7/00*   (2006.01)
*B23Q 7/14*   (2006.01)
(Continued)

(52) U.S. Cl.
CPC ........... *B23Q 7/005* (2013.01); *B23Q 7/1421* (2013.01); *B64F 5/10* (2017.01); *B65G 1/06* (2013.01);
(Continued)

(58) Field of Classification Search
CPC ...... B23Q 7/10; B23Q 7/1431; B23Q 7/1421; B23Q 7/005; B65G 1/04; B65G 1/06; B65G 2203/044; B65G 2201/0267; B64F 5/10
(Continued)

(56) References Cited

U.S. PATENT DOCUMENTS

| 5,380,138 A * | 1/1995 | Kasai ................. B65G 65/00 414/277 |
| 7,437,810 B2 * | 10/2008 | Ota ......................... B23Q 1/66 29/33 P |
| 2002/0050439 A1 * | 5/2002 | Watanabe ............... B23Q 1/48 198/346.1 |

(Continued)

FOREIGN PATENT DOCUMENTS

| CN | 102114604 A | 7/2011 |
| CN | 105592976 A | 5/2016 |

(Continued)

OTHER PUBLICATIONS

ISA European Patent Office, International Search Report Issued in Application No. PCT/EP2020/072339, Nov. 11, 2020, WIPO, 6 pages.

*Primary Examiner* — James R Bidwell
(74) *Attorney, Agent, or Firm* — McCoy Russell LLP

(57) ABSTRACT

In a cell with linked horizontal machining centers, each with two swivel arms for manipulating and changing pallets, which can be conveyed to and from a support in a conveying direction, each horizontal machining center is assigned at least one multi-storey pallet rack which is offset in the conveying direction relative to the front side and in which a pallet through-path is provided, and at least one rack storage and retrieval device with a lifting function transverse to the conveying direction is moveable at least between the pallet racks.

14 Claims, 13 Drawing Sheets

(51) Int. Cl.
*B64F 5/10* (2017.01)
*B65G 1/06* (2006.01)

(52) U.S. Cl.
CPC ............... *B65G 2201/0267* (2013.01); *B65G 2203/044* (2013.01)

(58) Field of Classification Search
USPC ....................................................... 198/347.1
See application file for complete search history.

(56) References Cited

U.S. PATENT DOCUMENTS

| | | | |
|---|---|---|---|
| 2002/0116805 A1 | 8/2002 | Koike | |
| 2015/0266151 A1* | 9/2015 | Komatsu | B23Q 3/15713 483/1 |
| 2018/0312349 A1 | 11/2018 | Morfino et al. | |

FOREIGN PATENT DOCUMENTS

| | | | | |
|---|---|---|---|---|
| CN | 107531425 A | | 1/2018 | |
| CN | 108788793 A | | 11/2018 | |
| DE | 9218147 U1 | | 8/1993 | |
| DE | 60115645 T2 | | 9/2006 | |
| DE | 102009040811 A1 | | 3/2011 | |
| DE | 102014113663 A1 | | 3/2016 | |
| DE | 102017217878 A1 | | 4/2019 | |
| EP | 462533 | * | 6/1991 | ............... B23Q 7/10 |
| EP | 3272681 A1 | | 1/2018 | |
| EP | 3395497 A1 | | 10/2018 | |
| FR | 2779133 A1 | | 12/1999 | |
| GB | 1202362 A | | 8/1970 | |
| JP | H0492745 U | | 8/1982 | |
| JP | S61297066 A | | 12/1986 | |
| JP | 2019136793 A | | 8/2019 | |

* cited by examiner

CELL AND METHOD FOR OPERATING A CELL OF AT LEAST TWO LINKED HORIZONTAL MACHINING CENTERS

CROSS REFERENCE TO RELATED APPLICATIONS

The present application is a U.S. National Phase of International Application No. PCT/EP2020/072339 entitled "CELL AND METHOD FOR OPERATING A CELL COMPOSED OF AT LEAST TWO INTERLINKED HORIZONTAL-PROCESSING CENTRES," and filed on Aug. 10, 2020. International Application No. PCT/EP2020/072339 claims priority to German Patent Application No. 10 2019 213 872.1 filed on Sep. 11, 2019. The entire contents of each of the above-listed applications are hereby incorporated by reference for all purposes.

TECHNICAL FIELD

The disclosure relates to a cell as well as to a method for operating a cell.

BACKGROUND AND SUMMARY

Machining centers with a horizontal Z-axis (e.g. 5-axis machining centers) work with very large pallets, for example up to 20 m long and 4 m wide. Each pallet is placed in a horizontal position, e.g. on a support (setup position), equipped (equipped with blanks) and dismantled after machining the workpiece or workpieces. During machining, an equipped pallet is clamped in an almost vertical position in the horizontal machining center. After machining, the pallet is released and, with pivot arms, brought into the horizontal position and placed on the support. Stored pallets take up an extremely large amount of space which is required, in conventional pallet stations of a cell, for pallets stored next to one another and which are moved translationally between storage, setup and loading positions. In order to significantly reduce the required storage areas, solutions are known in practice in which two pallets are placed alternately on the support and supplied alternately to the horizontal machining center. In order to enable the highest possible machining throughput in the cell, a large number of pallets is required which not only demands a lot of space but which must also be moved in and out of storage locations over long distances. This increases inexpediently the space required for the cell and negatively affects, e.g. due to long transport routes, the machining throughput and the utilization.

The disclosure is based on the problem of specifying a cell of the aforementioned type and a method for operating it with regard to pallet manipulation which, despite an optimally large number of pallets, is characterized by reduced space requirements, undelayed pallet transport and high machining throughput with optimal utilization of the cell.

Since each horizontal machining center of the cell is assigned its own multi-storey pallet rack in the immediate vicinity in which one storey is assigned a pallet flow path to and from the support in front of the horizontal machining center, as well as a rack storage and retrieval device with lifting function that can be moved transversely to the conveying direction of the pallets to and from the support, which can be moved at least between the pallet racks of the horizontal machining centers of the cell, a large number of pallets can be directly kept ready and transported back and forth using the cell using the shortest route without any delay, and even in a number that exceeds the number of pallets required by the machining centers for continuous machining. This enables high machining throughput and optimal utilization of the cell.

In the process, the respective pallet rack is not only used to store pallets, for example, that have already been set up in the immediate vicinity of the respective horizontal machining center, but also to transport one pallet each to and from the support of the horizontal machining center, actually with the aid of the rack storage and retrieval device act, so that each horizontal machining center, with a surprisingly small space requirement, receives the required pallets without delay and pallets removed from the horizontal machining center can be transported off in the same way without the risk of collision with others.

In the cell, the horizontal machining centers are expediently arranged one behind the other, parallel to one another, spaced apart only by at least the width of each pallet rack, and along the outside of the pallet racks facing away from the horizontal machining centers, a travel lane is provided for the rack storage and retrieval device(s). Apart from the intermediate distance between the horizontal machining centers used to accommodate the respective pallet rack, the horizontal machining centers can be placed very close together in the cell which means that paths between the pallet racks and from them to the centers are optimally short, and the space required by the cells is small.

With at least one end of the cell, a set-up table is provided, in addition to a pallet rack; the set-up table is approachable by the rack storage and retrieval device. In this case, the travel lane also extends at least to the front of the set-up table. In some embodiments, the set-up table, a roller table, can be separated from the travel lane by an adjustable lock gate. The respective pallet can be easily pushed onto or removed from the set-up table with little effort; where the lock gate increases the operational safety for personnel working at the set-up table, for example. Manipulations at the set-up table are carried out, for example, with industrial trucks, e.g. to bring in an empty or set-up pallet or to deliver or remove workpieces.

The pallet rack expediently has at least three storeys, the lowest of which forms the pallet flow path as a roller conveyor with driven rollers. The top storeys for the intermediate storage of pallets can also be roller conveyors, if necessary with driven rollers, in order to be able to move the pallets quickly.

The support in front of each horizontal machining center expediently is a roller table which should be at the same height as the pallet flow path in the pallet rack next to it. The set-up table next to the pallet rack may be lower than the pallet flow path in the pallet rack to make it easier for staff to work on the set-up table.

If only one pallet rack is provided for each horizontal machining center, this could also have more than three storeys for the intermediate storage of further pallets, which can be approached by the rack storage and retrieval device with the lifting function. Alternatively, in a further embodiment, a further multi-storey pallet rack, again with a pallet flow path, could be provided at each horizontal machining center opposite the pallet rack in the conveying direction on the other side of the horizontal machining center, in which case it would then be expedient for these further pallet racks for the horizontal machining centers of the cell, a travel lane can be arranged running along the cell with at least one rack storage and retrieval device with a lifting function. The space required for this solution is only marginally larger than with only one pallet rack per horizontal machining center.

In an expedient embodiment, the rack storage and retrieval device is at least provided with travel and lifting drives and it is a roller table standing in a travel lane and being height-adjustable on lifting columns. The rack storage and retrieval device can thus serve all pallet racks in the cell and all storeys of the pallet racks, but also the set-up table The lock gate can be height adjustable, and a lock linked with the actuation of the lock gate—in particular a light barrier—is expediently provided on the side of the set-up table facing away from the lock gate. If, for example, industrial trucks go through the barrier to the set-up table while personnel is in the area of the set-up table, the lock gate assumes its locking position which is only opened when there is no longer any danger to the personnel or to industrial trucks at the set-up table.

According to the procedure, it can finally be expedient if a respective workpiece is positioned by an industrial truck on an empty pallet placed on the set-up table or removed from the pallet for the purpose of emptying it. If, on the other hand, a pallet with a partially machined workpiece is brought by the industrial truck along the travel lane for further processing to another pallet rack of another horizontal machining center, either an empty pallet is brought onto the set-up table by the rack storage and retrieval device at a suitable point in time, or an empty pallet is provided with an industrial truck.

BRIEF DESCRIPTION OF THE FIGURES

An embodiment of the disclosure will be explained with reference to the drawings. The following is shown.

DETAILED DESCRIPTION

Figure 1:
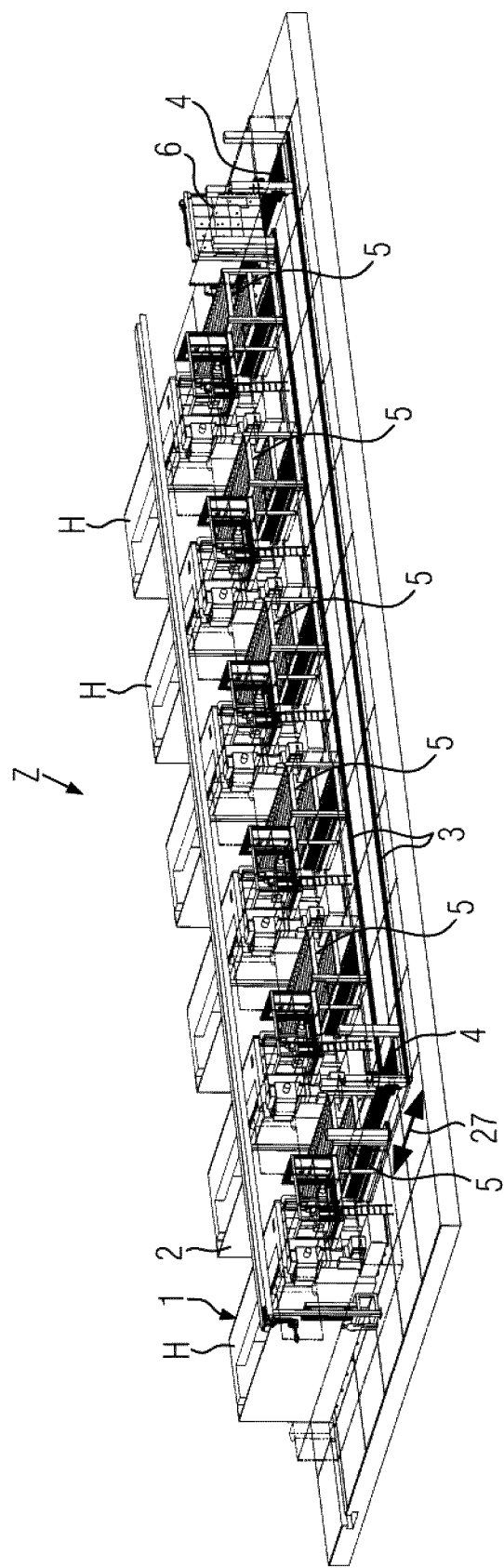
FIG. 1 a cell with six linked horizontal machining centers, in a perspective view.

FIG. 1 is an overall view of a cell Z of six linked horizontal machining centers H; for example, for machining aircraft parts forming workpieces. FIGS. 2 to 13 show successive phases of operation on the non-limiting example of the extreme right horizontal machining center H in FIG. 1. As is usual in this technology, the frequently large dimensioned workpieces are fixed on pallets and brought, with the pallets, for machining into the respective horizontal machining center. These pallets can have dimensions of up to 4 m in width and 20 m in length. The respective workpiece is fixed on the pallet when manipulating the pallet in the horizontal machining center and during machining, for example, by applying negative pressure to the set-up side of the pallet.

The horizontal machining centers H are arranged in an aligned row one behind the other in the embodiment shown of the cell Z, such that a respective front 1 faces the rear 2 of the next horizontal machining center and which are arranged parallel to one another and with intermediate distances that are only slightly larger than the width of at least one pallet rack 5 assigned to the side of each horizontal machining center. Each pallet rack fulfills the task of a pallet buffer store and a lock.

In the embodiment of the cell Z shown here, only one pallet rack 5 is provided for each horizontal machining center. In an alternative not shown, a similarly designed pallet rack 5 could be placed on the opposite side of each or at least of one horizontal machining center.

Along the outer sides of the pallet racks 5 in FIG. 1, a travel lane runs parallel to the row of horizontal machining centers H, on which at least one rack storage and retrieval device 4 can be moved; in the embodiment shown in FIG. 1, there are even two rack storage and retrieval devices 4. Travel lane 3 is extended at the right end in FIG. 1 beyond the pallet rack 5 there positioned, up to at least one lock gate 6 which can be approached by the rack storage and retrieval device 4 and behind which a set-up table 16 is provided, as shown in FIG. 2.

One purpose of the linking is to provide the linked horizontal machining centers universally and quickly with pallets and workpieces arranged on them or to transport them away for optimal utilization with the lowest possible space requirement. Another purpose of the linking is to machine workpieces in a horizontal machining center only partially, and then to transfer the pallets to other horizontal machining centers in which the finishing or another intermediate processing step is performed.

Figure 2:
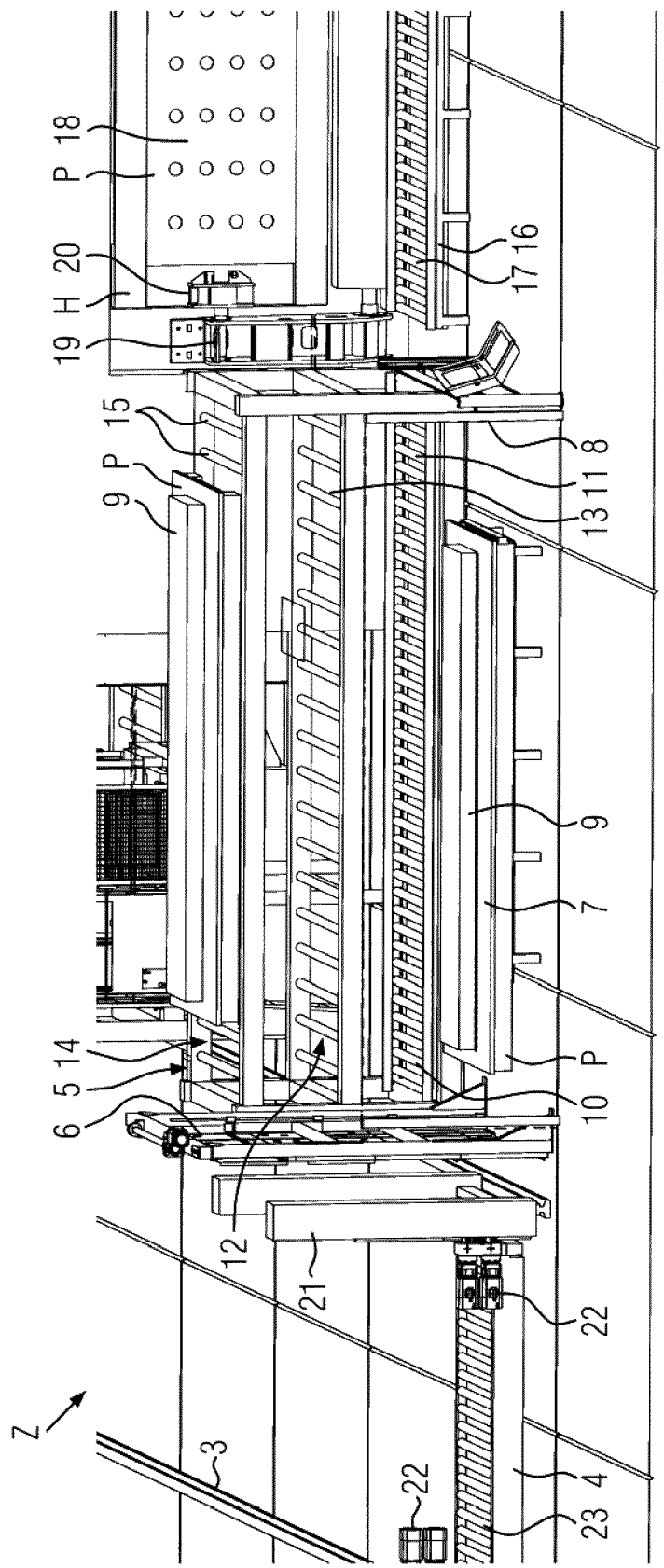
FIG. 2 a perspective view of a corner area of the cell, in FIG. 1 on the right.
Figure 3:
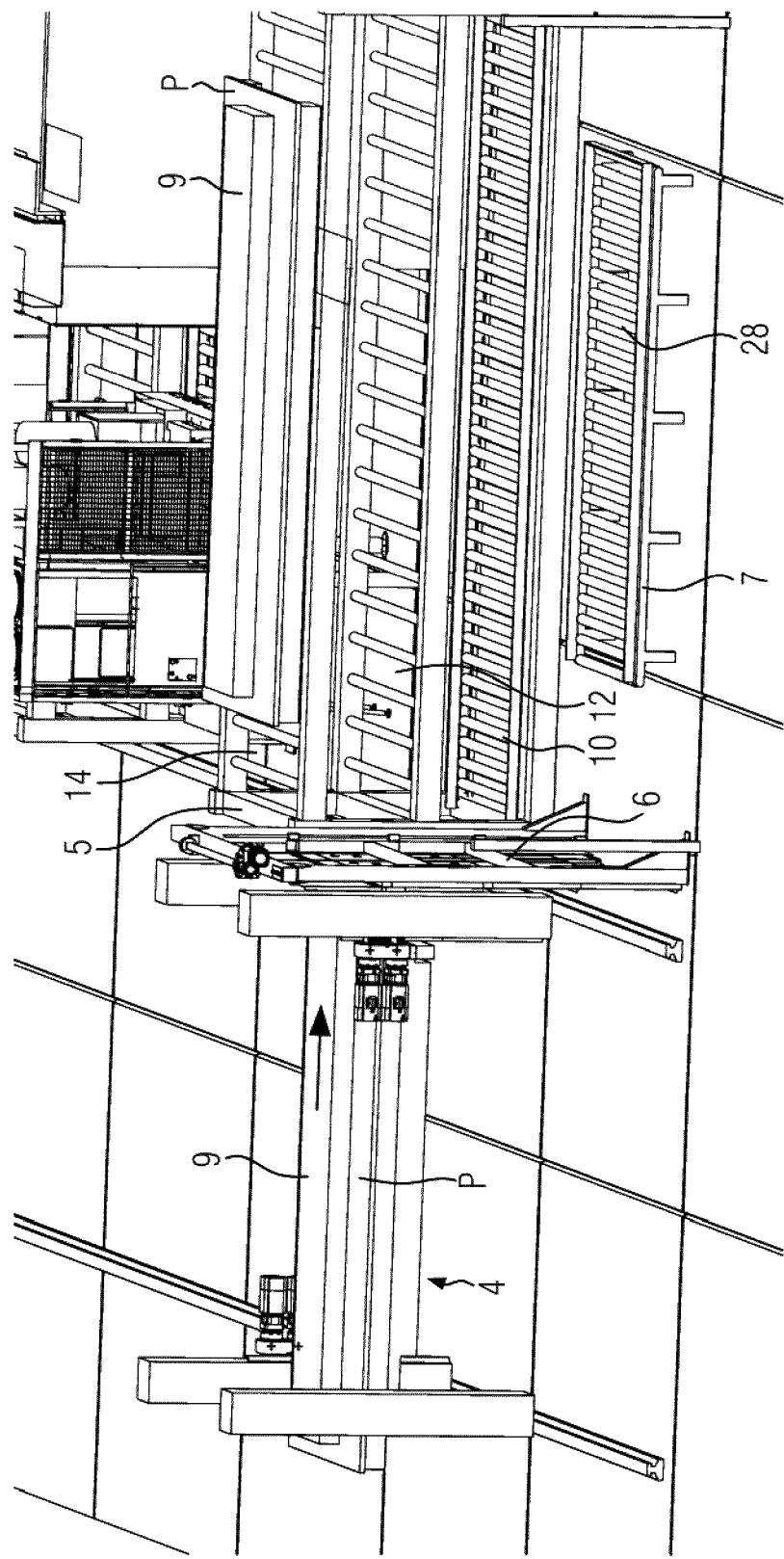
FIG. 3 shows a view similar to that of FIG. 2 when a pallet provided with a workpiece is entered into a pallet rack.

FIG. 2 shows the right end of the cell Z in FIG. 1, at the lock gate 6, in front of which the rack storage and retrieval device 4 is provided in the travel lane 3, and behind which the set-up table 7 is located which is housed in, for example, and accessible via a lock 8, e.g. a light barrier. On the set-up table 7, a pallet P is placed on which a workpiece 9 is provided, a blank for example.

The pallet rack 5 assigned to the horizontal machining center H is parallel to the front 1 of the horizontal machining center H and to the conveying direction of pallets indicated by an arrow 27 in FIG. 1 and is offset laterally to the front. The pallet rack 5 is multi-storey, i.e. it has a pallet flow path 10 formed by the lowest storey, for example in the form of a roller conveyor 11 with at least some driven rollers, as well as a middle storey 12 also as a roller conveyor 13 and a top storey 14 as a roller conveyor 15 as well. In an alternative not shown, the pallet rack 5 could also have at least one further upper storey. On the top storey 14 in FIG. 2, a pallet P is provided with a workpiece 9 while the middle storey 12 is empty.

Directly in front of the horizontal machining center H and in parallel to it, a table-shaped support 16 is provided which is expediently designed as a roller conveyor. In the horizontal machining center H in FIG. 2, a pallet P is already provided in its clamped machining position in an approximately vertical position, such that a rear side 18 of the pallet P faces outwards, while the workpiece not shown is being machined. For manipulating and changing the pallets P, the horizontal machining center H has two swivel arms 19 on which pallet carriers 20 are arranged that can be rotated by about 180°, on and from which the respective pallet can be docked and undocked. Two pallets P, then back to back, can also be docked on and handled.

The rack storage and retrieval device 4 is a roller table movable in the travel lane 3 with four lifting columns 21 here to raise the roller table 23 to the respectively required height. Furthermore, travel and lifting drives 22 are provided on the rack storage and retrieval device 4.

In FIG. 2, for example, the pallet P placed on the setup table 7 was equipped with the workpiece 9 using an industrial truck (not shown). The rack storage and retrieval device 4 has moved in front of the lock gate 6 which is lowered. In order to convey the pallet P with the workpiece 9 away from the set-up table 7, the lock gate 6 is raised and the pallet is transferred to the rack storage and retrieval device 4, which then moves to the position of FIG. 3 in front of the pallet rack 5 and is lifted up to the height of the middle storey 12 of the pallet rack 5. The pallet P with the workpiece 9 is still located on the top storey 14. As a result, in FIG. 3, the pallet P with the workpiece 9 is transferred from the rack storage and retrieval device 4 to the middle storey 12 of the pallet rack 5 and stored there before the rack storage and retrieval device 4 is lifted to the height of the top storey 14 and, according to FIG. 4, it takes over the pallet P stored there with the workpiece 9. The rack storage and retrieval device 4 is then lowered to the bottom storey or the pallet flow path 10 before the pallet P with the workpiece 9 is transferred into the flow path 10 in the conveying direction 27 according to FIG. 5. The top storey 14 of the pallet rack 5 is now empty, while the middle storey 12 temporarily stores the pallet P with its workpiece. Lock gate 6 is again in the blocking position shown in FIG. 2. Set-up table 7 can remain empty.

Figure 6:
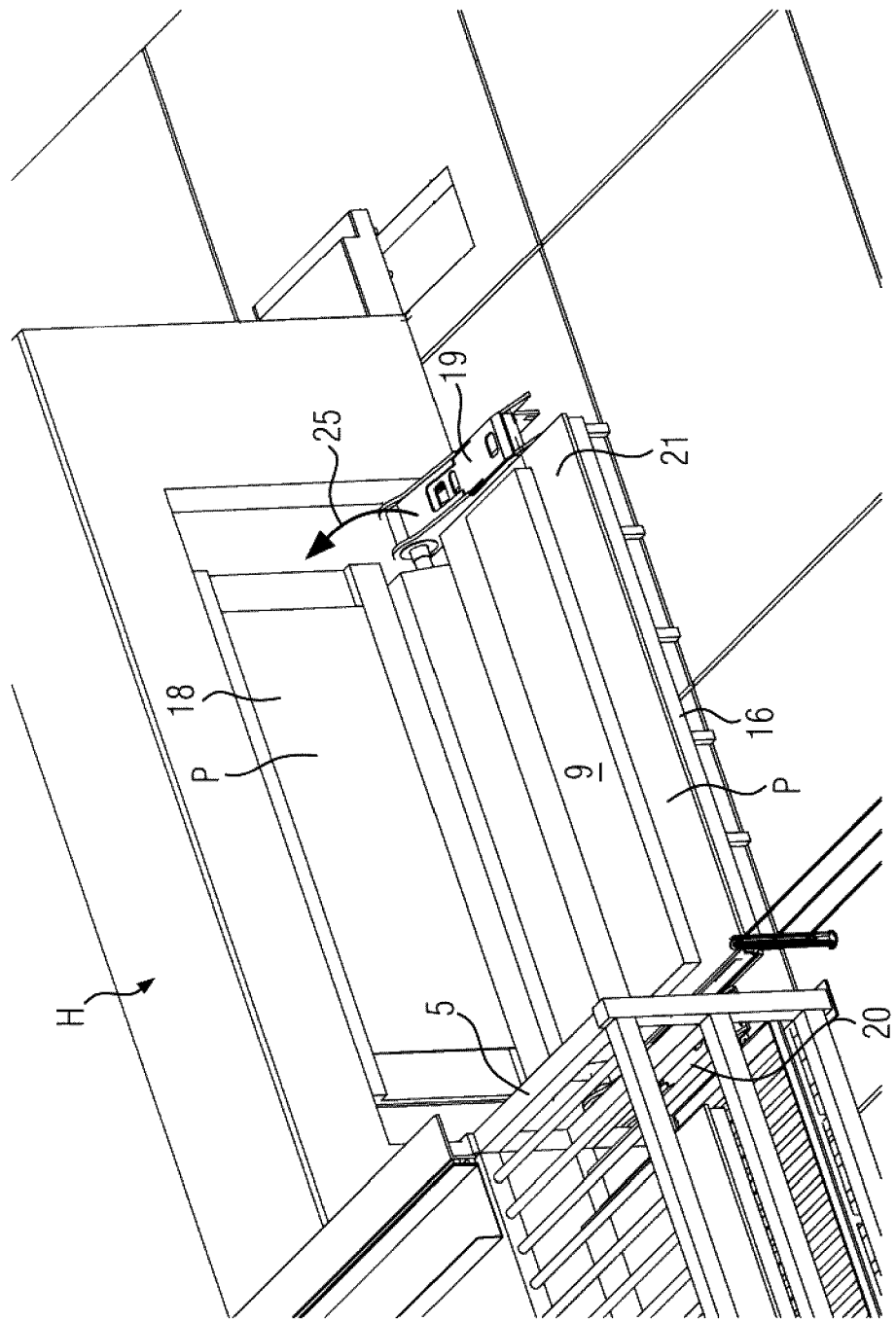
FIG. 6 shows the beginning of a pallet changing operation in the horizontal machining center.
Figure 7:
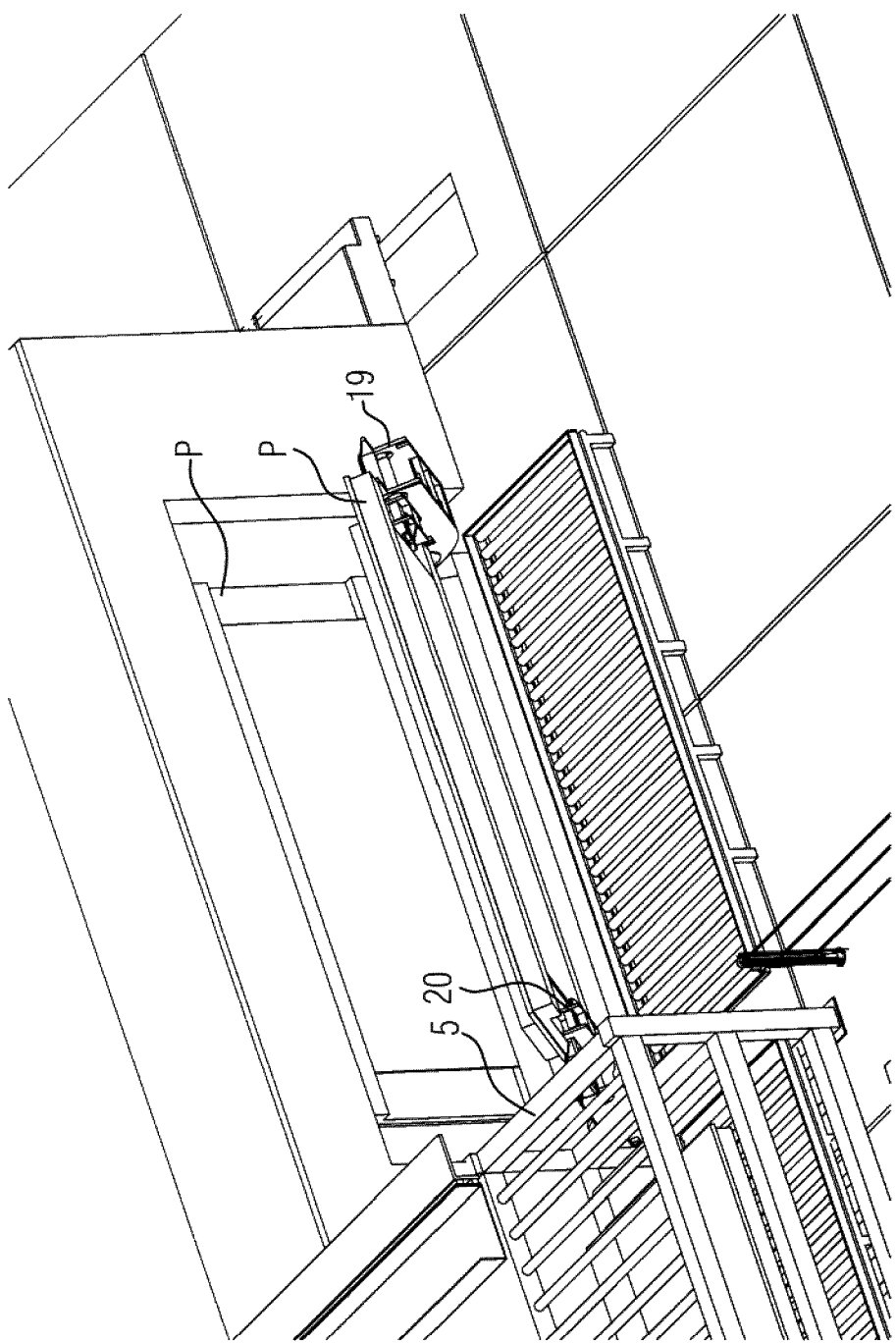
FIG. 7 another phase when changing pallets.
Figure 8:
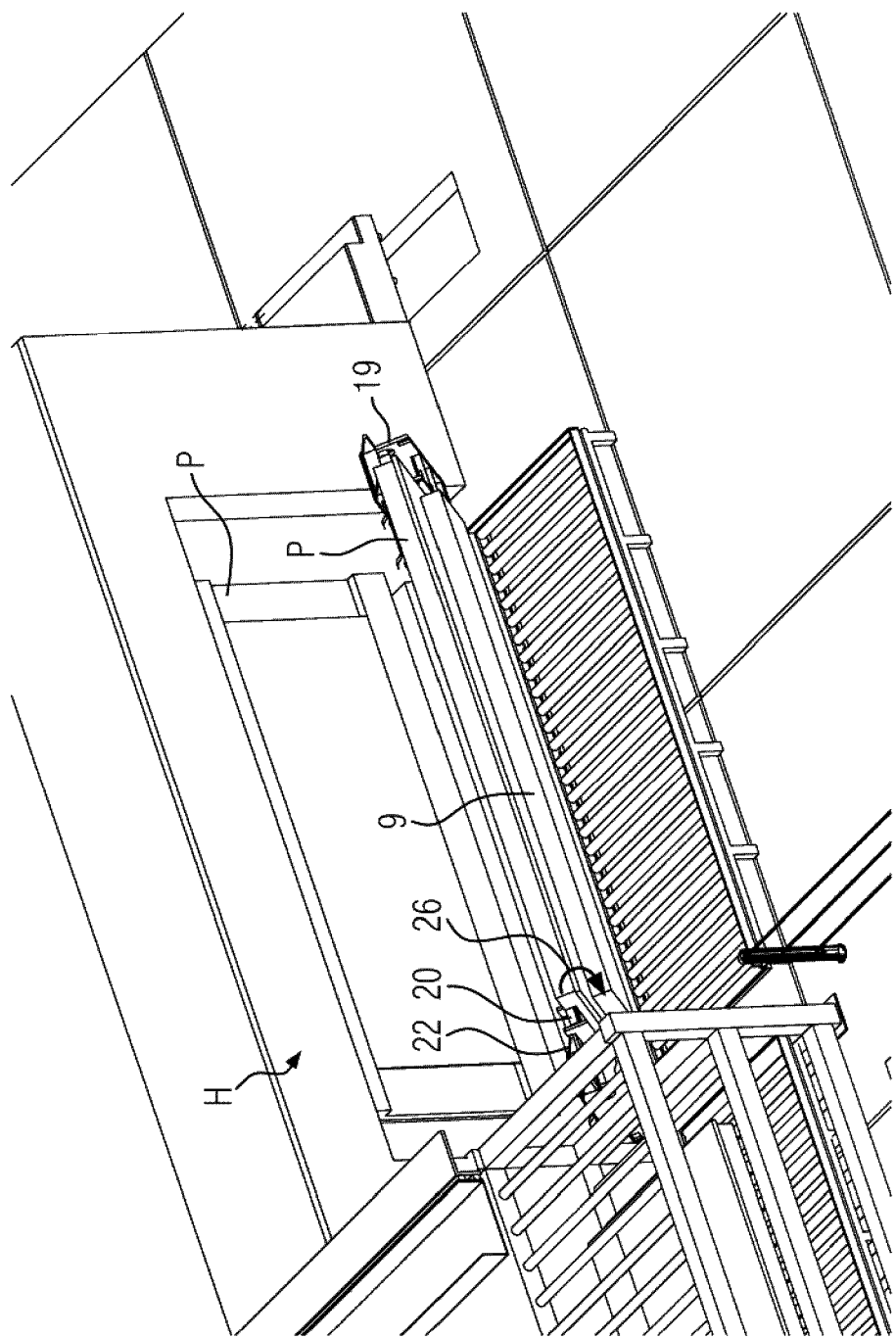
FIG. 8 another phase when changing pallets.
Figure 9:
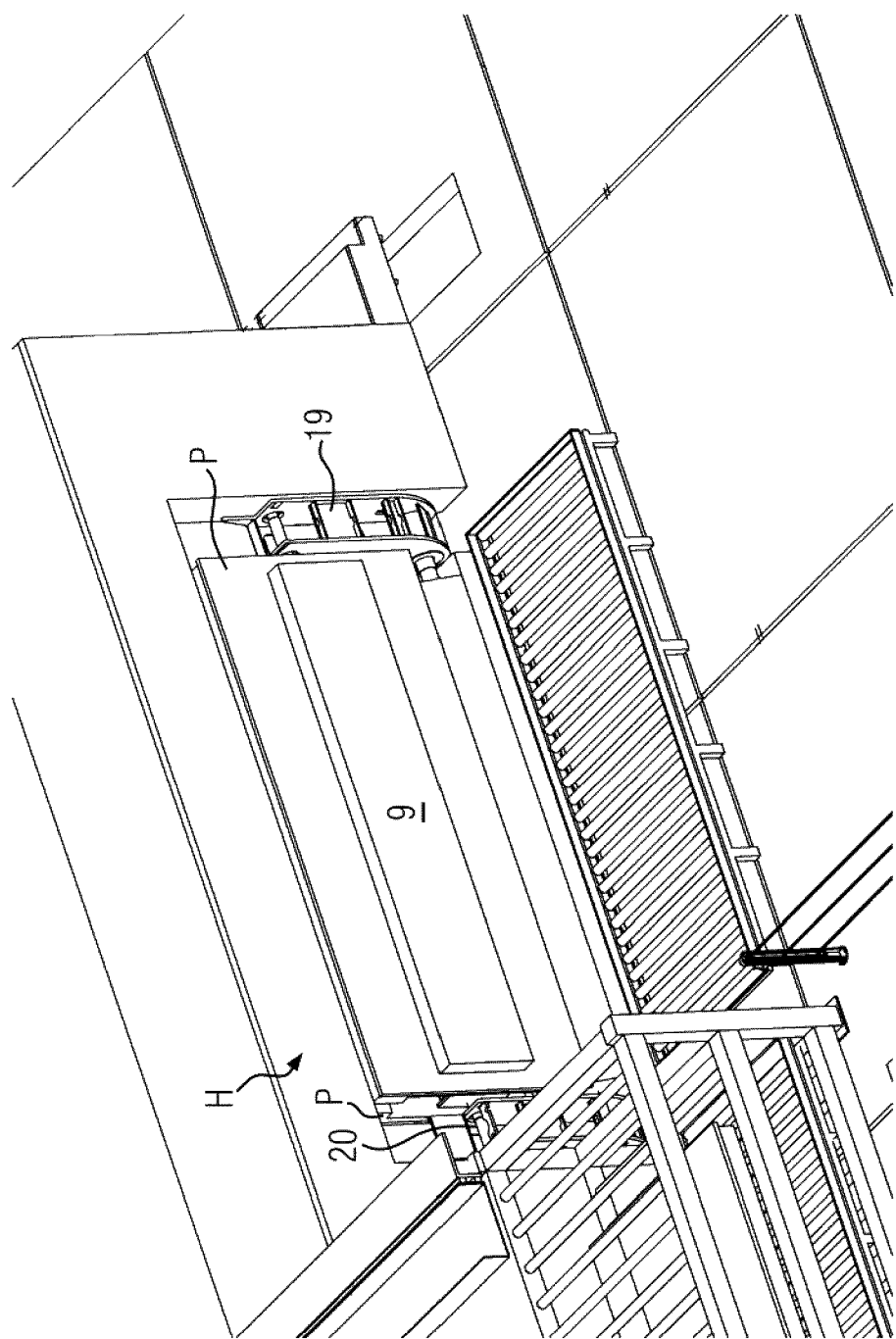
FIG. 9 another phase when changing pallets.

According to FIG. 6, pallet P with the workpiece 9 is stored, after passing through the pallet flow path 10, in the pallet rack 5 on the support 16 which, for example, has the same height as the pallet flow path 10. The two swivel arms 19 are now lowered and pallet P is docked to the pallet carrier 20 and vacuum is applied, for example, in order to fix the workpiece 9 in place. The other pallet P, whose back 18 is to be seen in FIG. 6, is still in the machining position in the horizontal machining center H during machining Swivel arms 19 are now swiveled up to approx. 45° in the direction of arrow 25, and the docked pallet P according to FIG. 7 is turned by a turning axis 22 defined by the pallet carriers 20 on swivel arms 19, by 180° from the position shown in FIG. 7 to the position shown in FIG. 8, turned by the turning axis 22 defined on swivel arms 19 an pm swoveö ar,s 10. by the pallet carriers 20 friso that the workpiece 9 on pallet P faces outwards from the horizontal machining center H. As a consequence and in accordance with FIG. 9, pallet P is brought by swivel arms 19 with its back against the back 18 of the pallet P located in the horizontal machining center; the pallet, firmly clamped in the working position in the horizontal machining center H is released and docked to the pallet carriers 20 and, according to FIG. 10, both pallets P are jointly lowered by the swivel arms 19 by about 45° and turned around the turning axis 22 in the direction of an arrow 29, so that the finished machined or partially machined workpiece 9' faces outwards from the horizontal machining center, and the unmachined workpiece faces inwardly on the inner pallet P.

Figure 10:
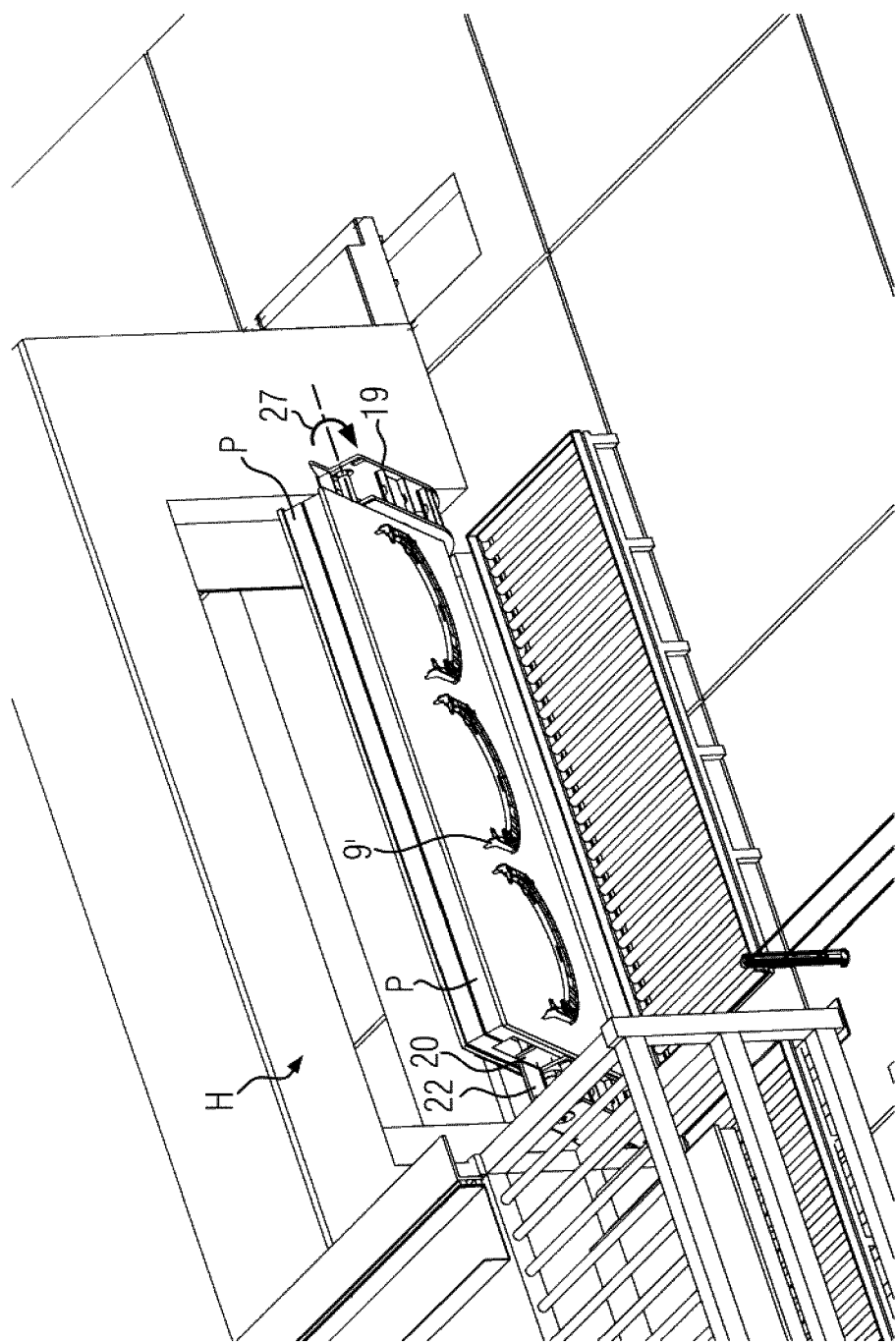
FIG. 10 another phase when changing pallets.
Figure 11:
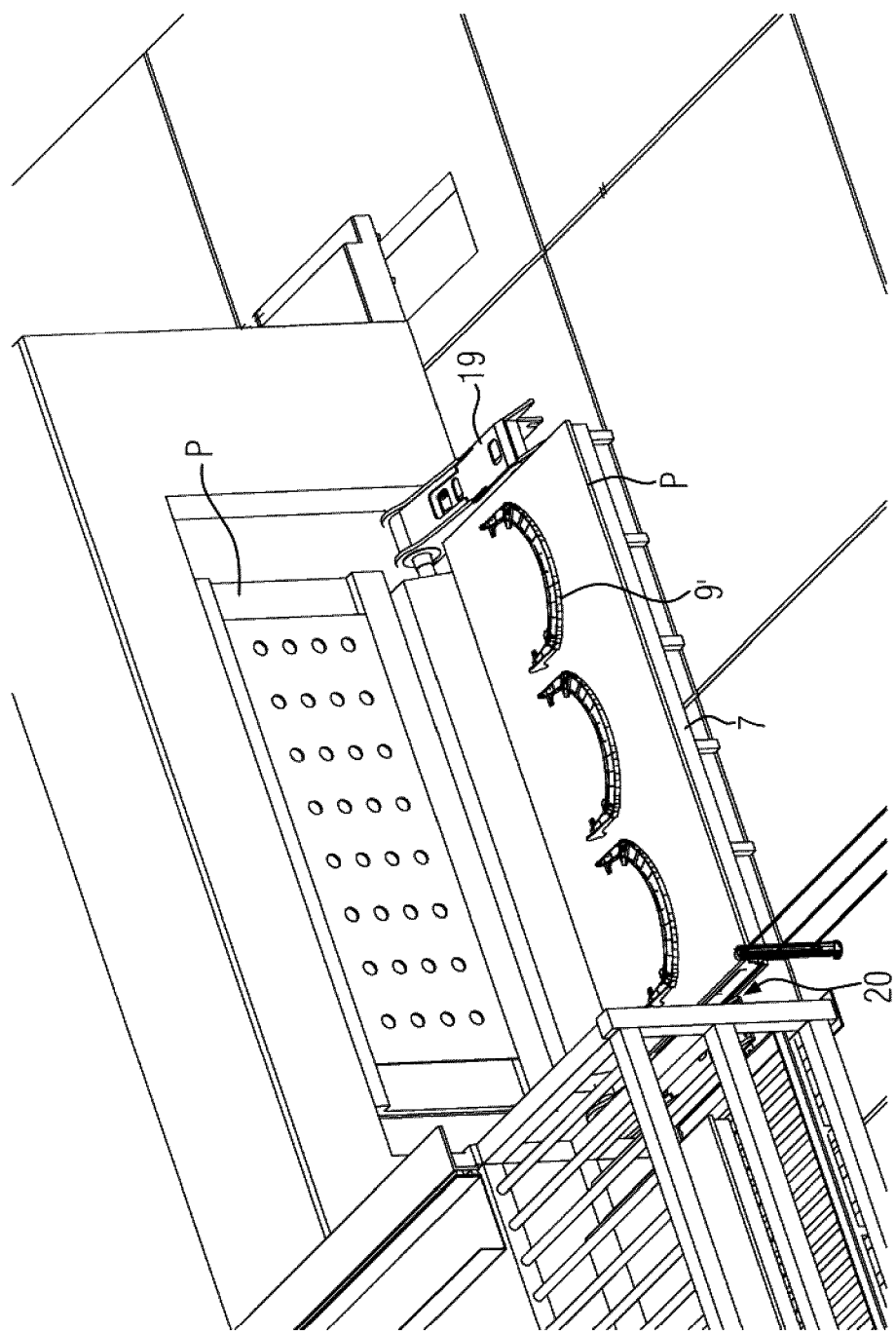
FIG. 11 the final phase of changing pallets.

Between the position shown in FIG. 10 and the position shown in FIG. 11, both docked pallets P are swivelled adequately downwards by swivel arms 19 from both sides of the support 16 to the horizontal machining center H, and the inner pallet P is firmly clamped in the machining position and docked off by the pallet carriers 20 so that, consequently and according to FIG. 1, the individual pallet P is stored with the machined or partially machined workpiece 9' upwardly indicating support 7, and it is docked off by the pallet carriers 20 before the swivel arms 19 are swivelled upwardly into a resting position.

Figure 12:
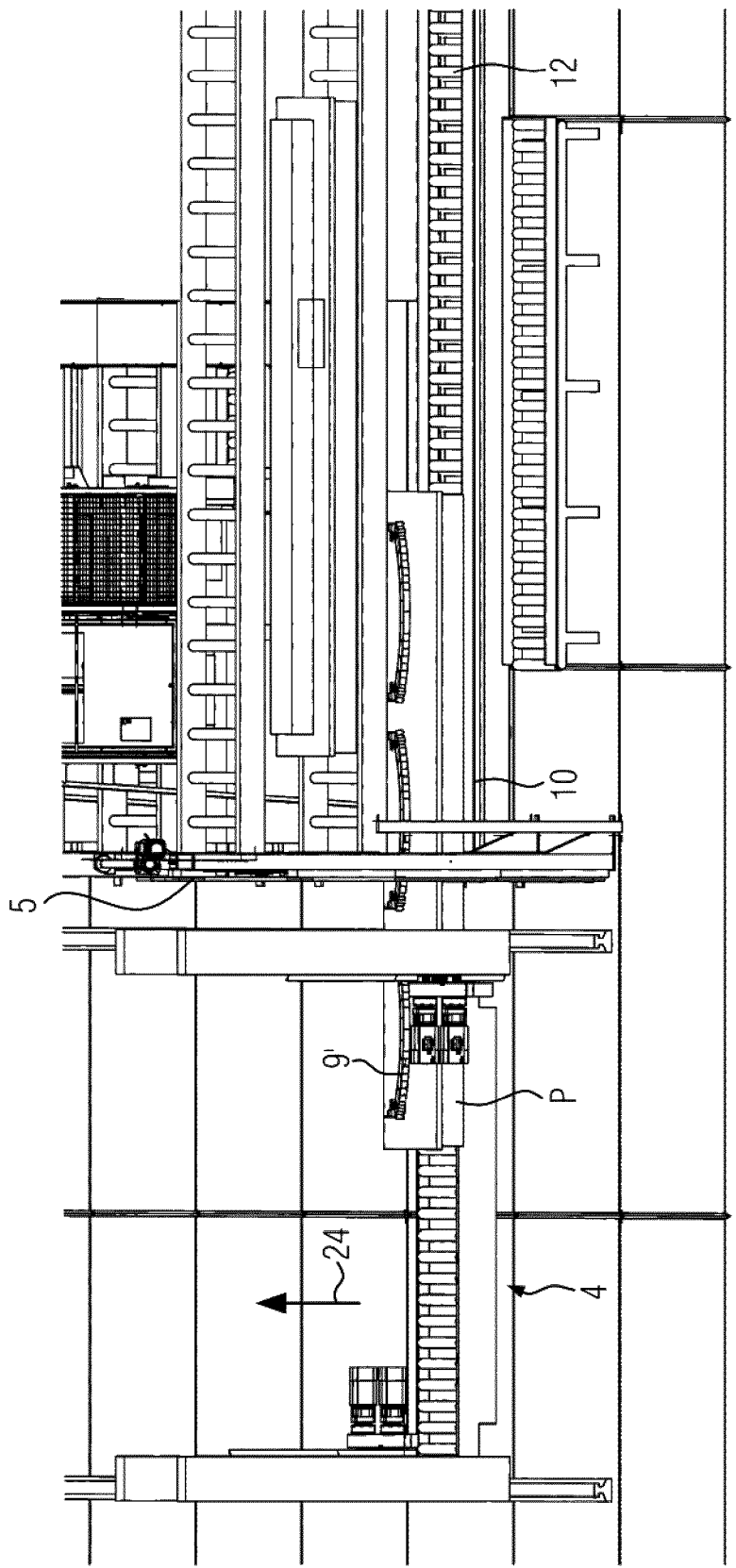
FIG. 12 the removal of the changed pallet by a rack storage and retrieval device.
Figure 13:
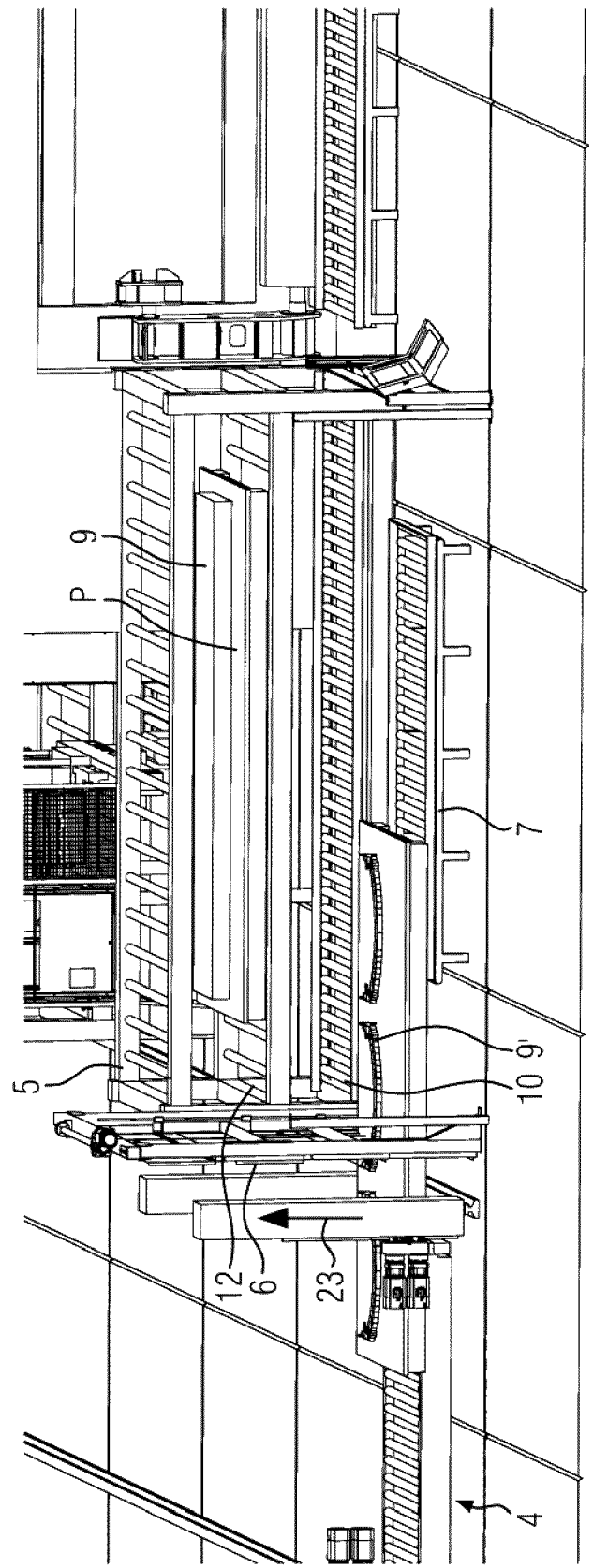
FIG. 13 shows the transfer of the changed pallet with the machined workpiece to a set-up table in the cell.

In accordance with FIG. 12, pallet P with the workpiece 9' is transferred through the pallet flow path 10 of the pallet rack 5 to the readily prepared and lowered rack storage and retrieval device 4 and, if necessary, transferred from it in the direction of arrow 24 to another of the linked horizontal machining centers H to be machined further or finished machining. Alternatively, and as indicated in FIG. 13, the rack storage and retrieval device 4 is moved in front of the lock gate 6, the lock gate 6 is opened, and pallet P with the workpiece 9' is transferred to the set-up table 7. The set-up table 7 can actually also be arranged lower than the pallet flow path 10 in order to make work easier for personnel working at the set-up table. After pallet P with the workpiece 9' is properly positioned on the set-up table 7 in accordance with FIG. 13, lock gate 6 is closed and workpiece 9' finish machined in this case is removed e.g. by an industrial truck not shown so that pallet P is empty and ready for loading with a new workpiece, as shown in FIG. 2. For maintenance or special cases, each individual horizontal machining center H can be separated from the automation and loaded separately with workpieces and pallets using industrial trucks or cranes.

Figure 4:
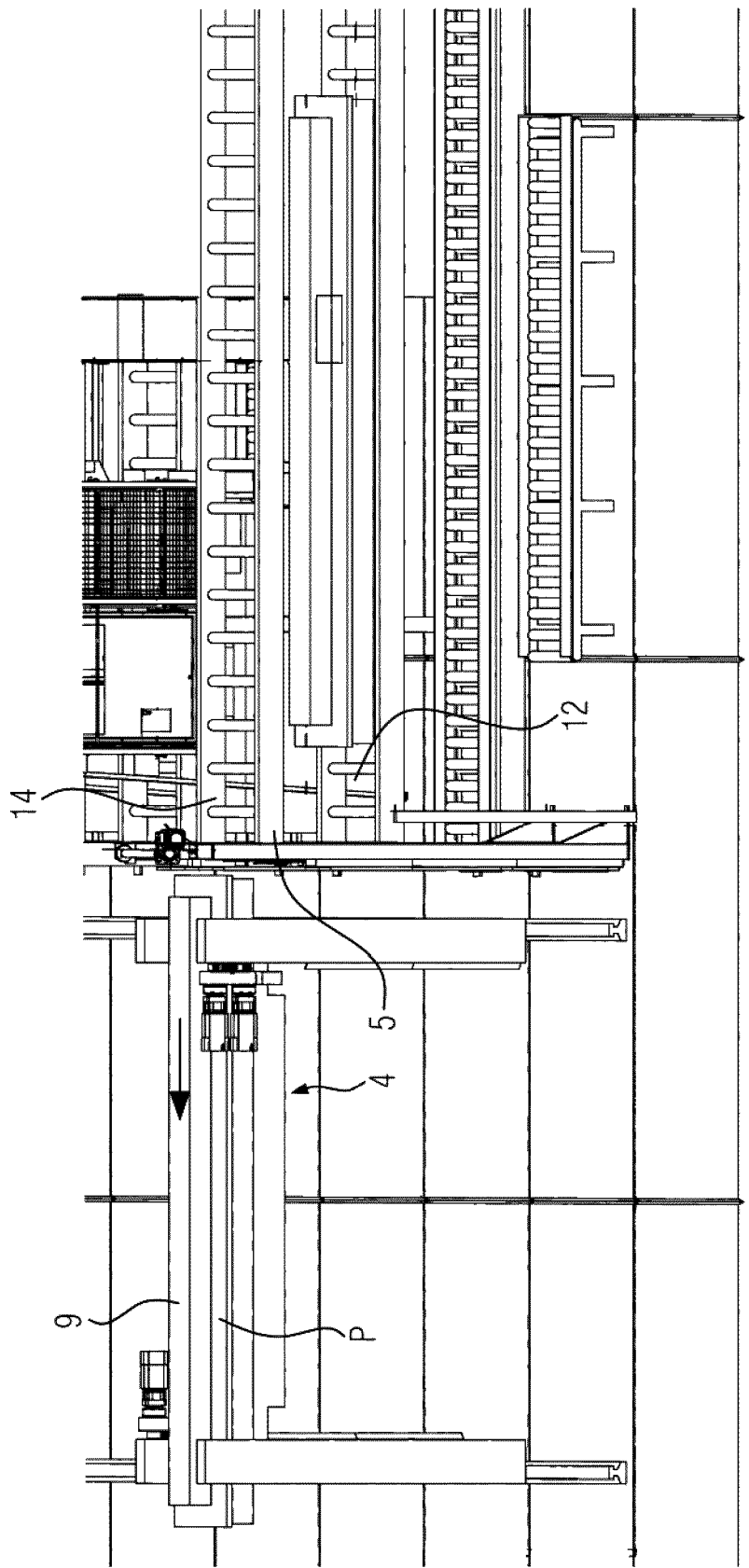
FIG. 4 shows a phase upon removal of a pallet from the pallet rack.
Figure 5:
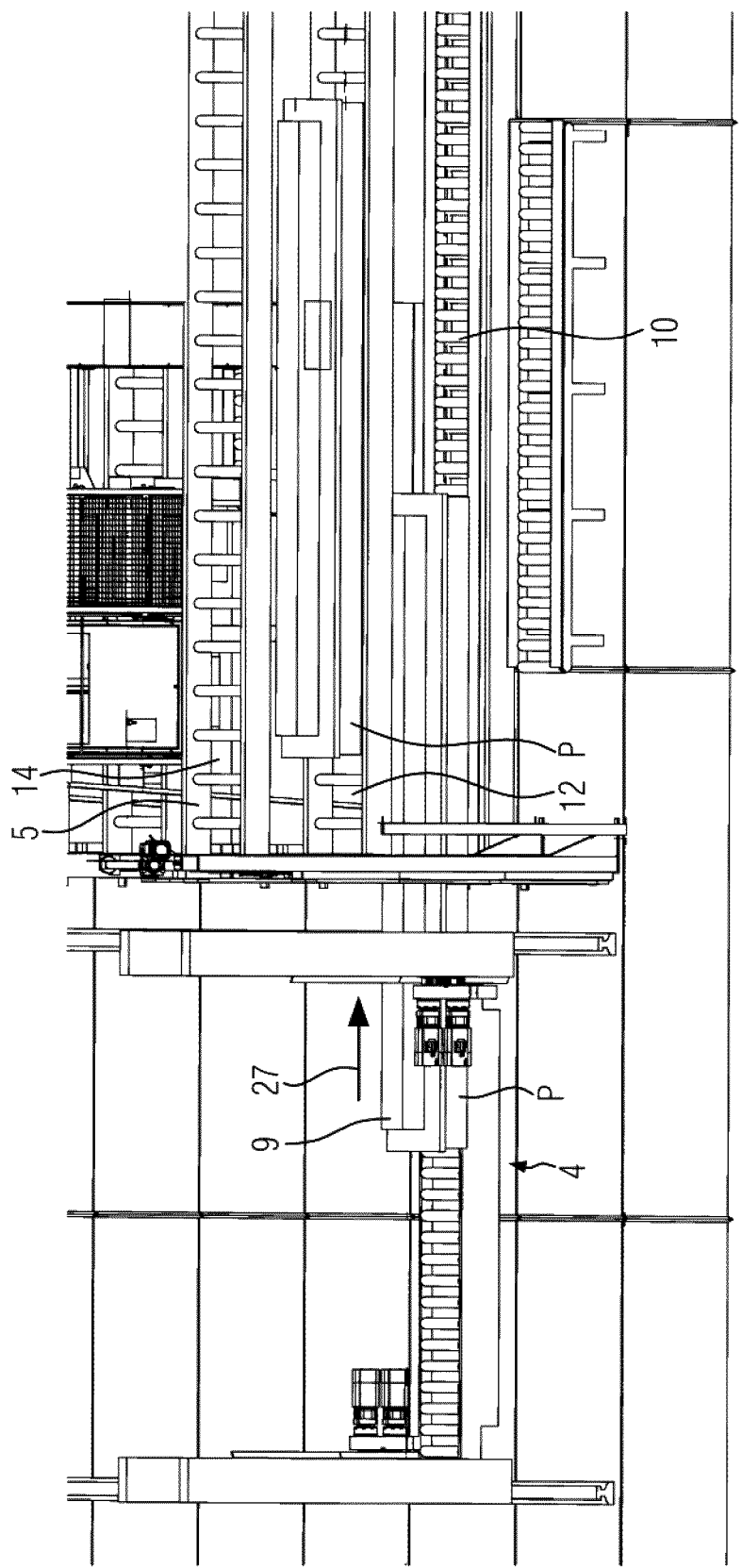
FIG. 5 shows the transfer of the removed pallet to the horizontal machining center.

According to FIG. 4, the pallet P with the workpiece 9 was taken from the top store 14 of the pallet rack 5 and the middle storey 12 was loaded with the pallet P procured from the set-up table 7. After the phase shown in FIG. 13, the rack storage and retrieval device 4 can load pallet P with a new workpiece 9 (e.g. a blank) onto the top storey 14 of the pallet rack 5, and remove the pallet stored in the middle storey 12 and convey it to the horizontal machining center H via the pallet flow path 10.

In another variant of the method for manipulating pallets P, the pallet procured from set-up table 7 with a workpiece 9 could be conveyed from the rack storage and retrieval device 4 directly via the pallet flow path 10 to the horizontal machining center H and not first temporarily stored in pallet rack 5; however, under the prerequisite that support 16 in front of the horizontal machining center was already emptied or is still empty.

The concept of the pallet rack 5 directly assigned to a horizontal machining center H and the rack storage and retrieval device 4 for transferring the pallets P is very expedient in a cell Z of linked horizontal machining centers H, but also for a horizontal machining center H working in stand-alone mode.

If the need arises to temporarily buffer another pallet P, the lower storey or the flow path 10 in the pallet rack 5 could also be used for this purpose, provided that the support 16 is empty or can be emptied in some other way.

FIGS. 1-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cell with at least two linked horizontal machining centers, each of which has two swivel arms on a front side for manipulating and changing pallets carrying workpieces on their set-up sides, which pallets being transported to and from a support can be conveyed into and out of the front side of a respective horizontal machining center, wherein each horizontal machining center of the cell is attributed, vis-à-vis the front side, at least one multi-story pallet rack staggered vis-à-vis the support in a conveying direction parallel to the front side and in which one story is a pallet flow path configured to transport each pallet to and from the support, the pallet flow path extending in the conveying direction, and wherein at least one rack storage and retrieval device with a lifting function is movable relative to the pallet rack and transversely to the conveying direction, at least between the pallet racks of the at least two linked horizontal machining centers of the cell.

2. The cell according to claim 1, wherein, in the cell, the at least two linked horizontal machining centers are arranged parallel to one another, spaced apart, behind each other, by at least the width of each pallet rack, and that along outer sides of the pallet racks facing away from the at least two linked horizontal machining centers, a travel lane is provided for the at least one rack storage and retrieval device(s).

3. The cell according to claim 2, wherein, in addition to the pallet rack, a set-up table approachable by the at least one rack storage and retrieval device is provided for workpieces conveyable to and from, that the travel lane extends at least up to the set-up table.

4. The cell according to claim 1, wherein the pallet rack has at least three stories, of which the bottom one of the at least three stories is a roller conveyor with driven rollers and which forms the pallet flow path, and that the upper stories of the at least three stories are roller conveyors with driven rollers.

5. The cell according to claim 3, wherein the support in front of each horizontal machining center is a roller table and that the pallet flow path in the pallet rack and the support are at the same height, with the set-up table being lower than the pallet flow path in the pallet rack.

6. The cell according to claim 3, wherein a lock gate is adjustable in height, and that on the side of the set-up table facing away from the lock gate, a blocking device linked with actuation of the lock gate is provided.

7. The cell according to claim 6, wherein the blocking device linked with the actuation of the lock gate is a light barrier.

8. The cell according to claim 3, wherein at least one end of the cell is used in addition to the pallet rack and set-up table.

9. The cell according to claim 3, wherein the set-up table is a roller table and is separated from the travel lane through an adjustable lock gate.

10. The cell according to claim 1, wherein with each horizontal machining center, the pallet rack in the conveying direction opposite the other side of the horizontal machining center, another multi-story pallet rack with a pallet flow path is arranged, and with these further pallet racks, a travel lane is arranged running along the horizontal machining centers with at least one movable rack storage and retrieval device with a lifting function.

11. The cell according to claim 1, wherein the at least two linked horizontal machining centers are for machining aircraft parts.

12. The cell according to claim 1, wherein the at least one movable rack storage and retrieval device equipped at least with travel and lifting drives is a roller table standing on running wheels and being height-adjustable on lifting columns.

13. A method for operating a cell with at least two linked horizontal machining centers, each of which has two swivel arms on a front side for manipulating and changing pallets carrying on their set-up sides workpieces, wherein a pallet conveyed to a support in front of the corresponding horizontal machining center with at least one workpiece is taken up with the corresponding swivel arm and transferable to a substantially vertical machining position clamped firmly in the corresponding horizontal machining center, and one of the workpieces is machined; another pallet with the workpiece fixed thereon is conveyed onto the support, taken up by the swivel arms, swivelled up, turned, and with its back is moved against the back of the first pallet; after the end of machining, both pallets with the swivel arms are lowered and turned by about 180°, the second pallet is brought into the machining position clamped in the horizontal machining center with the swivel arms, and the workpiece is machined; the first pallet with the swivel arms is lowered and turned using them, and is placed, with its set-up side and the machined workpiece pointing upwards, on the support and conveyed away, wherein a pallet conveyed to the support is each stored in at least one multi-story pallet rack laterally arranged next to the horizontal machining center; with a movable rack storage and retrieval device with lifting function conveyed alongside one of the horizontal machining centers of the cell; and that, beforehand, the pallet conveyed away from the support is transferred over a pallet flow path in the pallet rack to the movable rack storage and retrieval device and from this, it is transferred either to a pallet rack of another horizontal machining center for further machining the workpiece or to at least one set-up table.

14. The method according to claim 13, wherein one workpiece each is positioned by an industrial truck on an empty pallet placed on the at least one set-up table in the at least two linked horizontal machining centers of the cell or removed from the pallet for emptying it.

* * * * *